United States Patent
Karl

(10) Patent No.: US 8,219,691 B1
(45) Date of Patent: Jul. 10, 2012

(54) METHODS AND APPARATUS FOR REMOTELY WAKING UP A COMPUTER SYSTEM ON A COMPUTER NETWORK

(75) Inventor: Michael Karl, Karlsruhe (DE)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/330,191

(22) Filed: Dec. 19, 2011

Related U.S. Application Data

(63) Continuation of application No. 12/368,089, filed on Feb. 9, 2009, now Pat. No. 8,095,667.

(60) Provisional application No. 61/029,742, filed on Feb. 19, 2008.

(51) Int. Cl.
*G06F 15/16* (2006.01)

(52) U.S. Cl. .......................... 709/227; 709/229; 709/222

(58) Field of Classification Search .................... 709/227
See application file for complete search history.

(56) References Cited

U.S. PATENT DOCUMENTS

2003/0161348 A1 8/2003 Mills et al.
2005/0097378 A1 5/2005 Hwang

OTHER PUBLICATIONS

"White Paper: Wake on LAN Technology," *Lieberman Software Corporation*, Jul. 11, 2002, available at http://www.liebsoft.com/index.cfm/whitepapers/Wake_On_LAN.
"Magic Packet Technology," *Advanced Micro Devices*, Nov. 1995, Available at http://support.amd.com/us/Embedded_TechDocs/20213.pdf.

*Primary Examiner* — Wing Chan
*Assistant Examiner* — Andrew Woo

(57) ABSTRACT

In a method for waking up a computer, a data unit is received at a first port of a network switching device via a first network link. The first port of the network switching device is coupled to the first network link. The network switching device is used to determine whether the data unit includes data indicative of a wake-up event for the computer, and to change a state of a second network link to wake up the computer if the data unit includes data indicative of the wake-up event for the computer. The second network link is coupled to a second port of the network switching device.

13 Claims, 6 Drawing Sheets

METHODS AND APPARATUS FOR REMOTELY WAKING UP A COMPUTER SYSTEM ON A COMPUTER NETWORK

CROSS-REFERENCE TO RELATED APPLICATION

This application is a continuation application of U.S. patent application Ser. No. 12/368,089, filed on Feb. 9, 2009, now U.S. Pat. No. 8,095,667, which claims the benefit of U.S. Provisional Patent Application No. 61/029,742, filed on Feb. 19, 2008.

The disclosures of both of the above-referenced patent applications are hereby incorporated by reference herein in their entireties.

FIELD OF TECHNOLOGY

The present invention relates generally to communication networks and, more particularly, to remote wake-up capabilities in computer networks.

BACKGROUND

Computer systems can generally operate in and shift between different power states. In particular, many computer systems are configured to shift into some type of a low-power state (e.g., a sleeping state) when they are not in use. When a computer system is in a low-power state, it is typically possible to "wake up" the system (i.e., to return it to a relatively high-power state) via an external wake-up event, such as a mouse click, a key stroke, a push of a button, and so on. Some computer systems also have the capability to be woken up remotely over a network, e.g., by another computer system performing an after-hours maintenance routine on the network.

When a computer system is operating in a low-power state, the system typically still requires some power to support its remote wake-up capabilities. For example, the system's network adaptor may need to stay powered. Moreover, to sense and process remote wake-up events, the computer system may require a BIOS that is configured to accept such events, a special network adapter and driver, and so on.

SUMMARY

In one embodiment, a method for waking up a computer includes receiving, at a first port of a network switching device, a data unit via a first network link. The first port of the network switching device is coupled to the first network link. The method also includes using the network switching device to determine whether the data unit includes data indicative of a wake-up event for the computer, and to change a state of a second network link to wake up the computer if the data unit includes data indicative of the wake-up event for the computer. The second network link is coupled to a second port of the network switching device.

In another embodiment, a method for waking up a computer includes receiving, at a first port of a network switching device, a data unit via a first network communication link. The first port of the network switching device is coupled to the network communication link. The method also includes determining, with the network switching device, that the data unit includes data indicative of a wake-up event for the computer. The method further includes, in response to determining that the data unit includes data indicative of a wake-up event for the computer, changing a power state of a second network communication link to wake up the computer. The second communication link is associated with the computer. Changing the power state of the second network communication link to wake up the computer comprises the network switching device changing the power state of the second network communication link via a second port of the network switching device. The second port is coupled to the second network communication link.

In another embodiment, a switching device includes a plurality of ports including a first port and a second port. The switching device also includes a wake-up event detector configured to determine whether a data unit received, via a first network link coupled to the first port, includes data indicative of a wake-up event for a computer. The computer is coupled to the switching device via a second network link coupled to the second port. The switching device further includes a wake-up signal generator configured to wake up the computer via the second network link if the data unit includes data indicative of the wake-up event for the computer. The wake-up signal generator is configured to wake up the computer at least in part by changing a state of the second network link via the second port.

DETAILED DESCRIPTION

Figure 1:
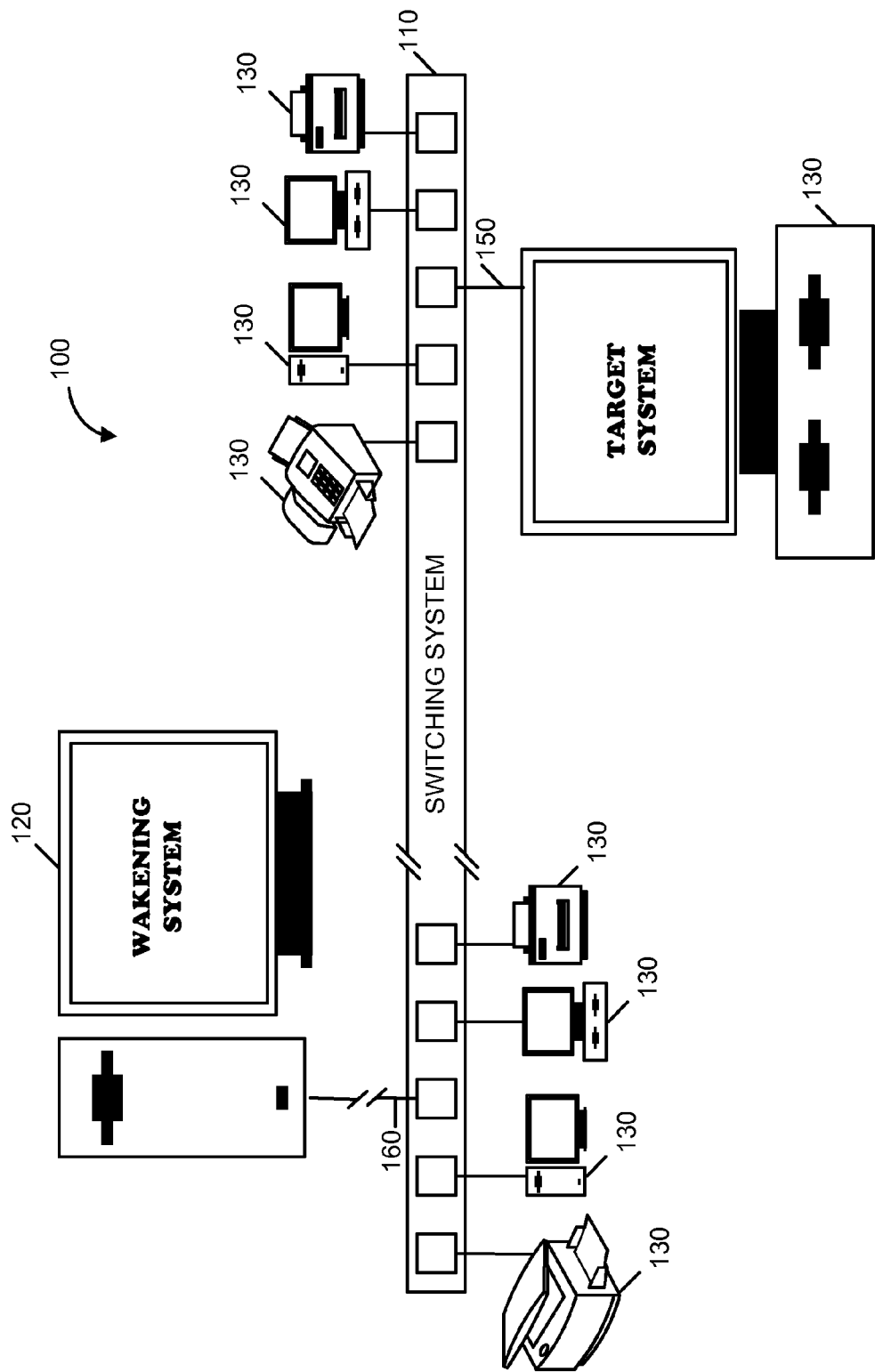
FIG. 1 is a block diagram of an example computer network with remote wake-up capabilities.

FIG. 1 is a block diagram of an example computer network 100 with remote wake-up capabilities. The computer network 100 includes one or more wakening systems 120 and one or more target systems 130. The wakening systems 120 and the target systems 130 could be a variety of devices. For example, a wakening system 120 could be a workstation, a personal computer, and so on. Also, for example, the target system 130 could be a personal computer, a workstation, printer, a copier system, a scanner, and so on.

The network 100 is configured so that if the target system 130 is in a low-power state (e.g., sleeping, hibernating, standby, and so on), the wakening system 120 can wake up the target system 130 (e.g., return the system to a working state) remotely over the network 100. The wakening system 120 can wake up the target system 130 using any remote wake-up protocol, such as the Wake-On-LAN (WOL) networking standard introduced by the Intel and IBM Advanced Manageability Alliance in April of 1997. Moreover, the wakening system 120 can wake up the target system 130 using any remote wake-up protocol, regardless of whether or not the target system 130 is configured to support the same remote wake-up protocol (or whether or not the target system 130 is configured to support any particular remote wake-up protocol 1).

The wakening system 120 and the target system 130 are coupled via a switching system 110, which is configured to process remote wake-up events. The target system 130 may be coupled to the switching system 110 via a direct communication link 150 (further referred to as "network link"). The wakening system 120 may also be coupled to the switching system 110 via a network link 160. However, both the wakening system 120 and the target system 130 may be coupled to the switching system 110 through other network devices or systems, including other switching systems, hubs, repeaters, bridges, routers, firewalls, modems, wireless devices, and so on. Therefore, the wakening system 120 and the target system 130 may, but are not required to, be on the same local area network (LAN), the same wide area network WAN, the same subnet, the same virtual private network (VPN), and so on.

Figure 2A:
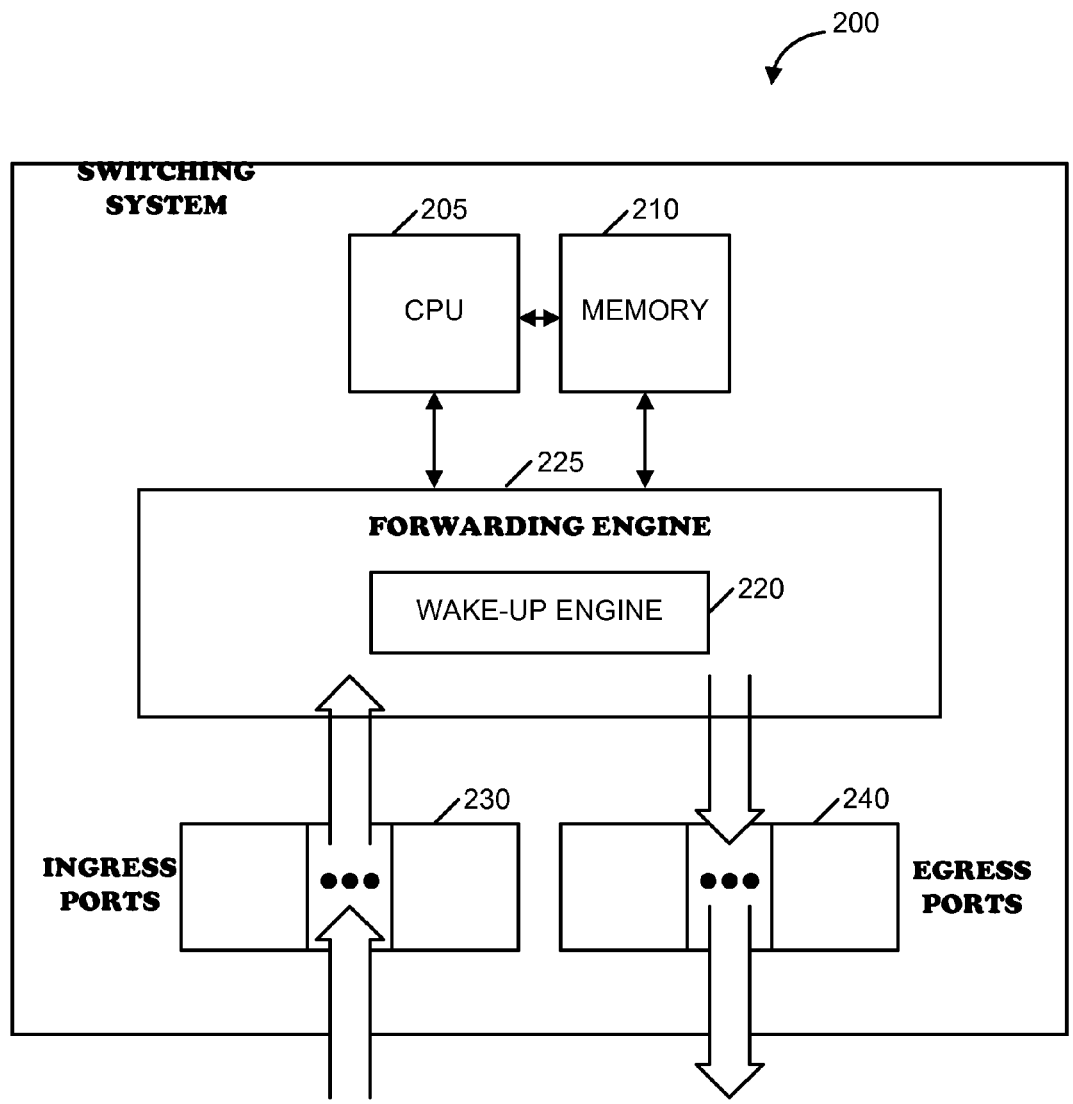
FIG. 2A is a block diagram of an example switching system that includes capabilities for handling wake-up events.

FIG. 2A is a block diagram of an example switching system 200 that is configured to process remote wake-up events. The switching system 200 may be utilized in the network 100 as the switching system 110, for example. It will be understood, however, that the network 100 may alternatively use another switching system 110.

The switching system 200 is generally a computer networking device that can connect two or more computer systems, network segments, subnets, and so on. For example, the switching system 200 may be an Ethernet switch. It should be understood, however, that the switching system 200 is not necessarily limited to a particular protocol layer or to a particular networking technology (e.g., Ethernet). For instance, the switching system 200 could be a router, a bridge, a VPN concentrator, and so on.

The switching system 200 includes one or more ingress ports 230 and one or more egress ports 240. The ingress ports 230 are generally for receiving data (e.g., packets), and the egress ports 240 are generally for transmitting data. The ingress ports 230 and the egress ports 240 are coupled together via a forwarding engine 225, which generally transfers packets of data from the ingress ports 230 to appropriate egress ports 240. The switching system 200 also may include a central processing unit (CPU) 205 coupled to the forwarding engine 225. The CPU 205 may execute computer readable instructions stored in a memory 210 coupled to the CPU 205.

On the other hand, the forwarding engine 225 may be implemented in hardware, e.g., on a single application specific integrated circuit (ASIC) coupled to the CPU 205. In other embodiments, other types of integrated circuits may be used such as a field programmable gate array (FPGA), a programmable logic array (PLA), a custom integrated circuit, etc. In other embodiments, the forwarding engine 225 may be implemented on multiple different integrated circuits that are coupled together.

The forwarding engine 225 generally performs wire speed functions associated with transferring packets from ingress ports 230 to egress ports 240, whereas the CPU 205 generally performs functions that can tolerate higher latency. The memory 210 also may be coupled to the forwarding engine 225. Alternatively The forwarding engine 225 further includes a wake-up engine 220 generally configured to detect and process wake-up events. Alternatively, the wake-up engine may be implemented, at least partially, by the CPU 205. The wake-up engine 220 generally monitors packets being transferred from the ingress ports 230 to the egress ports 240 to detect wake-up events generated by a wakening system 120. When a wake-up event is detected, the wake-up engine 220 generally causes an appropriate target system 130 to wake up. Operation of the wake-up engine 220 will subsequently be described in more detail.

Figure 2B:
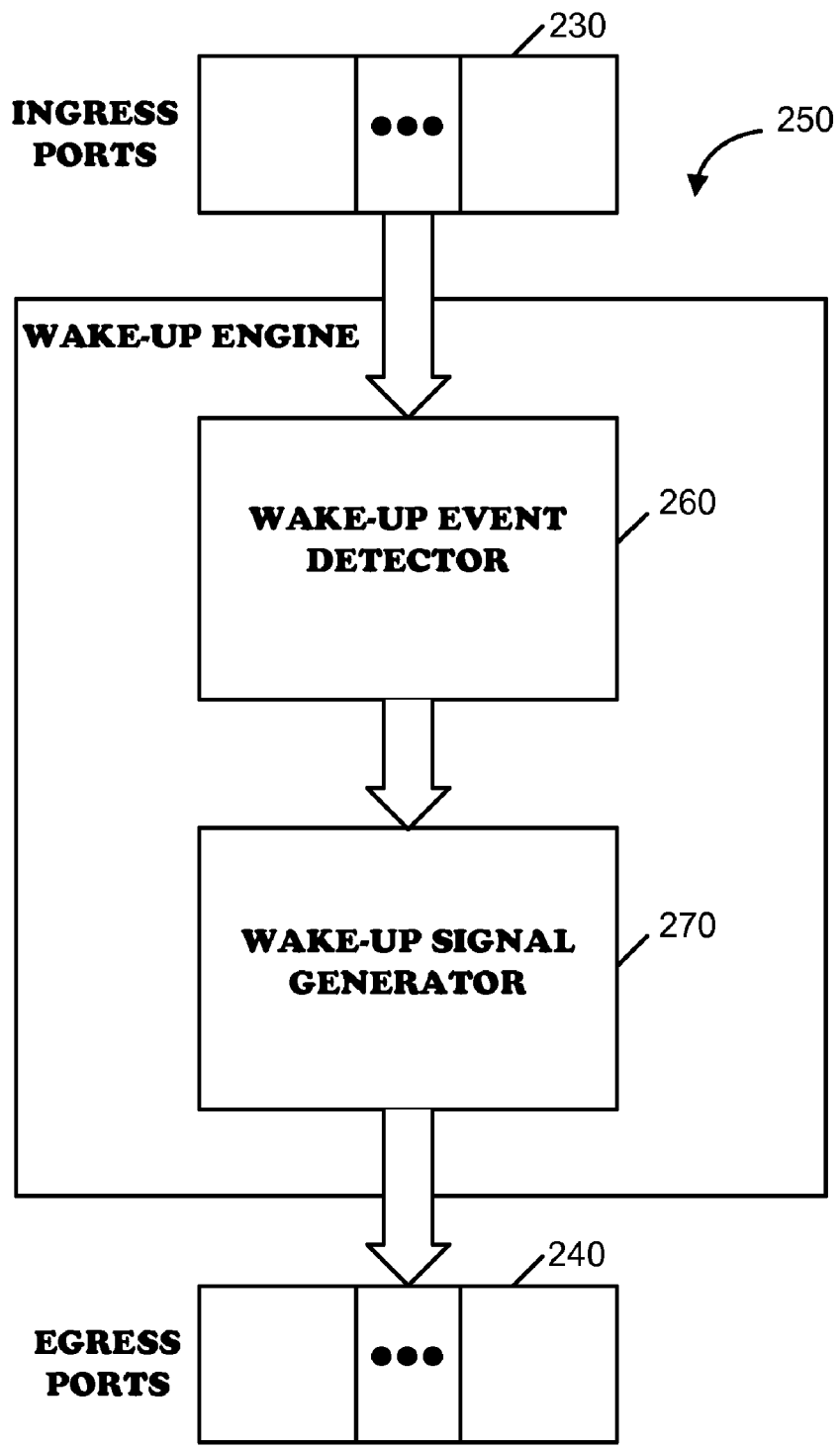
FIG. 2B is a block diagram of an example wake-up engine included in FIG. 2A.

FIG. 2B is a block diagram of an example wake-up engine 250. The wake-up engine 250 may be utilized in the forwarding engine 225 as the wake-up engine 220, for example. It will be understood, however, that the forwarding engine 225 may alternatively use another suitable wake-up engine 220. Similarly, the wake-up engine 250 may be used in a switching system other than the switching system 200 of FIG. 2A.

The wake-up engine 250 includes a wake-up event detector 260 configured to monitor packets being transferred from ingress ports 230 to the egress ports 240 and detect wake-up events generated by a wakening system 120. More specifically, as will subsequently be described in more detail, the wake-up event detector 260 is configured to receive (e.g., via the network link 160) a data unit (e.g., a packet) and determine whether the received data unit includes data indicative of a wake-up event for one or more of the target systems 130.

The wake-up engine 250 further includes a wake-up signal generator 270 configured to generate a wake-up signal on one or more appropriate egress ports 230, causing one or more target systems 130 coupled to the appropriate egress ports 230 to wake up. More specifically, as will subsequently be described in more detail, the wake-up signal generator 270 is configured to wake up a target system 130 via a communication link 150 if the data unit received by the wake-up event detector 260 includes data indicative of a wake-up event for the target system 130.

Figure 3:
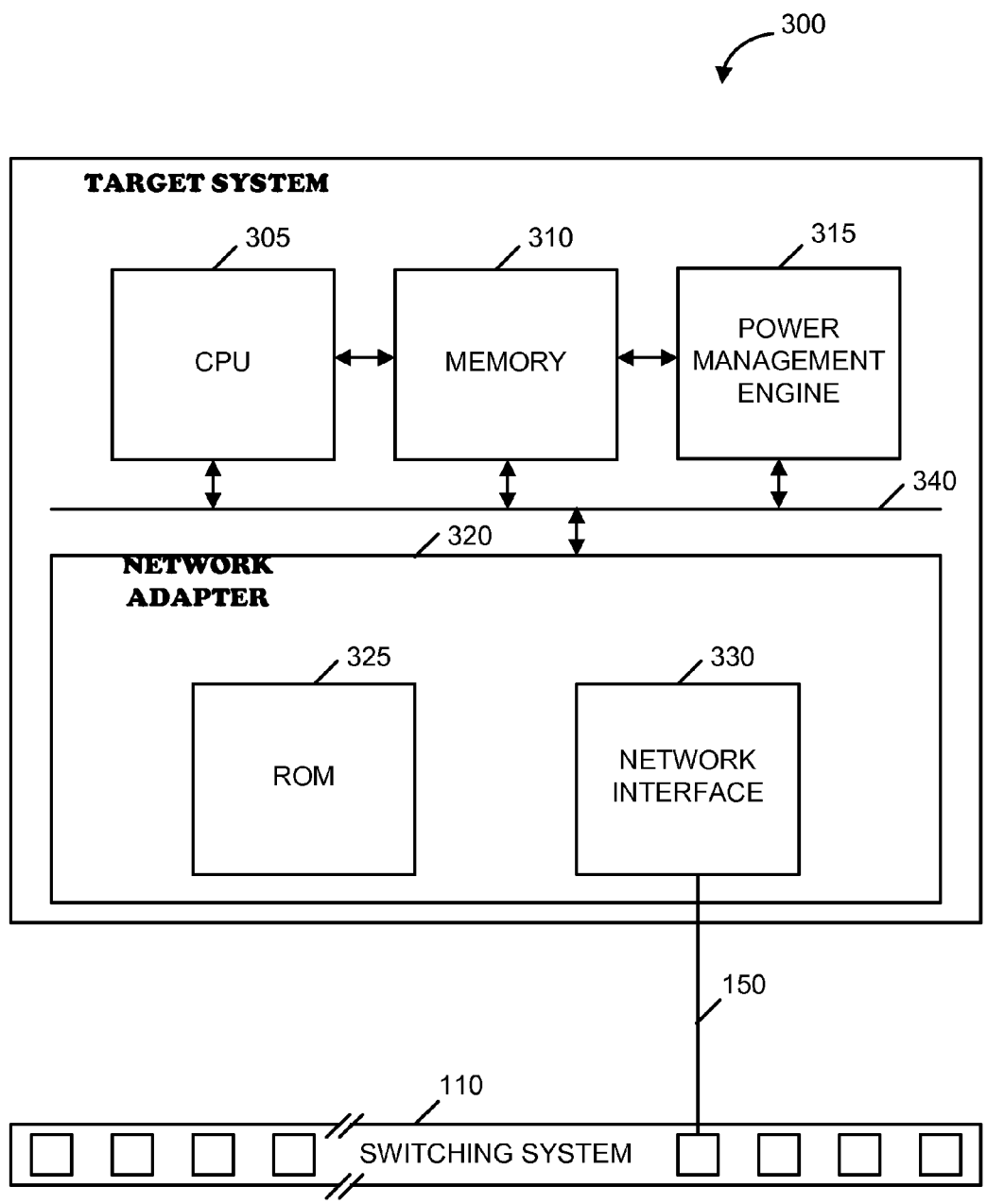
FIG. 3 is a block diagram of an example target system with remote wake-up capabilities.

FIG. 3 is a block diagram of an example target system 300. The target system 300 may be utilized in the network 100 as the target system 130, for example. It will be understood, however, that the network 100 may alternatively use another target system 130.

The target system 300 includes a central processing unit (CPU) 305 configured according to computer readable instructions stored on a memory 310 coupled to the CPU 305. The target system 300 further includes a power management engine 315 coupled to the CPU 305 and memory 310 (e.g., via a system bus 340). The power management engine 315 is configured to shift the target system 300, and devices included in the target system 300 (e.g., ports, controllers, adapters, processors, and so on), between different power states, e.g., as defined in Advanced Configuration and Power Interface (ACPI) Specification.

Different power states of the target system 300 may be characterized in terms of the system's power consumption; state of application software (i.e., whether application software is running on the system); response time of application software to external, e.g., wake-up events; reboot requirement of the operating system (i.e., whether a reboot of the operating system is required for the operating system to return to working state); safety of disassembly (i.e., whether the system may be safely disassembled); possible ways of entering and exiting the power state (i.e., whether it is possible to enter and exit the power state electronically, mechanically and so on); etc. The power states of the target system 300 may include a WORKING (G0) state, a SLEEPING (G1) state, a SOFT OFF (G2/S5) state, and a MECHANICAL OFF state, e.g., as described in the ACPI Specification.

In the WORKING (G0) state, the target system 300 may be operating normally. In this state, individual devices and processors of the target system 300 can have their power states changed dynamically. The user can select power characteristics of the target system 300 to optimize performance or battery life, for example, and the target system 300 can respond to external events in real time.

In the SLEEPING (G1) state, the target system 300 may generally use less power than in WORKING (G0) state. The target system 300 may appear to the user to be turned off, and the time for the target system 300 to return to the WORKING (G0) state may vary. Large elements of system context may be saved in the SLEEPING (G1) state, and an operating system reboot may not be required for the target system 300 to return to the WORKING (G0) state. The target system 300 may enter and/or exit the SLEEPING (G1) state electronically (e.g., in response to an electronic signal).

The target system 300 may operate in a number of different SLEEPING states, e.g., states S1-S4, as defined by the ACPI specification. In the S1 state, the CPU 305 may be stopped and processor caches may be flushed. However, power to the CPU 305 and memory 310 may be maintained, the hardware may preserve system context, and the system may be able to return to the WORKING (G0) state relatively quickly. In the S2 state, the target system 300 may generally use less power than in the S1 state. The CPU 305 may be powered off, and returning to the WORKING (G0) state may take more time than in the S1 state. In S3 state (also referred to as STANDBY or SLEEP state), the target system 300 may generally use less power than in the S2 state. The CPU 305, cache and chipset context may be lost. However, system memory context may be preserved. In S4 state (also referred to as HIBERNATE state), the target system 300 may generally use less power than in the S3 state. The hardware may be entirely turned off, but the system memory may be saved to disk. Power may be supplied via a standby line, and complete reboot of the operating system may be performed upon a wake-up event.

In the SOFT OFF state (G2/S5), the target system 300 may generally use less power than in the SLEEPING (G1) state. User-mode code and system-mode code may be disabled, and returning to the WORKING (G0) state may take a relatively long time because the target system 300 may have to be restarted. The target system 300 may enter and/or exit the SOFT OFF (G2/S5) state electronically (e.g., in response to an electronic signal).

In the MECHANICAL OFF (G3) state, the target system 300 may generally use less power than in the SOFT OFF (G2/S5) state. Power consumption may be at its minimum, and there may be no electrical current running through the circuitry of the system. The system may retain no hardware context, and returning to the WORKING (G0) state may take a relatively long time because the entire system may have to be restarted. The target system 300 may enter and/or exit the MECHANICAL OFF (G3) state in response to mechanical events (e.g., flipping of a switch or pushing of a button).

The target system 300 may include a number of devices, including ports, controllers, adapters, processors, and so on. An example device is a network adapter 320 (also referred to as network controller, network device, network card, and so on). The network adapter 320 generally allows the target system 300 to communicate with the switching system 200 via the network link 150, discussed in reference to FIG. 1. Although the network adapter 320 is illustrated in FIG. 3 as a device internal to the target system 300, the network adapter 320 may also be an external device, e.g., coupled to the target system 300 via universal serial bus (USB). The network adapter 320 may include a unique Media Access Control (MAC) address, e.g., stored on read-only memory (ROM) 325 of the network adapter 320. The network adapter 320 may also include an interface 330 for connecting to the switching system 200 via the network link 150.

Like other devices included in the target system 300, the network adapter 320 may operate in, and shift between, different device power states, e.g., in accordance with the Advanced Configuration and Power Interface (ACPI) Specification. Device power states may generally be characterized in terms of power consumption (i.e., how much power the device consumes), device context retention (i.e., how much of the device's context is retained by the hardware), driver restore requirements (i.e., what the device driver must do to restore the device to full functionality), and restore latency (i.e., how long it takes to restore the device to full functionality). Device power states include FULL ON (D0), FULL OFF (D3) and a number of INTERMEDIATE (D1, D2) power states.

In the FULL ON (D0) state, the network adapter 320 may be on and running, offering the full functionality and performance to the target system 300. The network adapter 320 may be consuming a relatively high level of power, the device context may be preserved, and relatively little wake-up time may be required to return the network adapter 320 to FULL ON (D0) state.

In the INTERMEDIATE D state, the network adapter 320 may be consuming less power than in the FULL ON (D0) state. Neither bus transmission nor bus reception may be allowed, and no interrupts may occur. The device context may be lost or preserved, depending on the specifics of the network adapter 320. More wake-up time may be required in INTERMEDIATE D1 state than in the FULL ON (D0) state, but minimizing the delay in restoring the network adapter 320 may nonetheless take priority over saving power.

In the INTERMEDIATE D2 state, the network adapter 320 may be consuming less power that in the INTERMEDIATE D1 state but more power than in the OFF (D3) state. Neither bus transmission nor bus reception may be allowed, and no interrupts may occur. The device context may be lost or preserved, depending on the specifics of the network adapter 320. More wake-up time may be required in the INTERMEDIATE D2 state than in the INTERMEDIATE D1 state (but less than in the OFF state), and saving power may take priority over minimizing the delay in restoring the network adapter 320.

In the OFF (D3) state, primary power may or may not be fully decoupled from the network adapter 320. Neither bus transmission nor bus reception may be allowed, no interrupts may occur, and the device context may be lost. To restore the network adapter 320 to the FULL ON (D0) state, reinitialization of the device may be required. Accordingly, the wake-up time in the OFF (D3) state may be relatively long.

Like other devices included in the target system 300, the network adapter 320 may shift between different device power states during operation. For example, if the network adapter 320 is in a low-power state (e.g., INTERMEDIATE or OFF), a wake-up event may wake up the network adapter 320, i.e., cause the network adapter 320 to shift into a high-power (e.g., FULL ON) state. Moreover, the shift in the power state of the network adapter 320 may itself serve as a wake-up event for the target system 300 as a whole, causing the target system 300 to wake up, i.e., shift power state (e.g., from SLEEPING to WORKING).

An example of a wake-up event that may wake up the network adapter 320, and, in turn, wake up the target system 300 is a change in the power state of the network link 150. The network link 150 may operate in different link power states (e.g., depending on the link speed), and the switching system 200 can control the power state of the network link 150. Therefore, the switching system 200 can wake up the network adapter 320, and, in turn, wake up the target system 300 by changing the power state of the network link 150.

As mentioned above in reference to FIG. 1, a target system such as the target system 300 may also be woken up remotely by the wakening system 120. In some implementations, the wakening system 120 may transmit a wake-up event (e.g., in accordance with the Wake-On-LAN standard) addressed to the target system 300. The target system 300 may be the sole addressee of the wake-up event. The target system 300 may also be one of several addressees corresponding to the wake-up event (e.g., if the wakening system 120 broadcasts or multicasts the wake-up event).

The wake-up event transmitted by the wakening system 120 may take a number of forms. In some implementations, the wake-up event may be a packet (or several packets) that includes some pre-defined data that is indicative of a wake-up event. With regard to the target system 300, the pre-defined data that is indicative of a wake-up event may include a pre-defined fixed pattern, e.g., the Internet Protocol (IP) address of the network adapter 320 of the target system 300, or another IP address associated with the target system 300 or one of its devices. In some implementations, pre-defined data indicative of a wake-up event may be encapsulated in a Magic Packet™, as defined by the Wake-On-LAN standard, and the Magic Packet™ may be encapsulated in an IP packet, an Internetwork Packet Exchange (IPX) packet, a Transmission Control Protocol (TCP) packet, a User Datagram Protocol (UDP) packet, and so on. The Magic Packet™ may include the unique Media Access Control (MAC) address associated with the target system 300 (e.g., the MAC address of the network adapter 320 of the target system 300) or several duplications of the MAC address. In some implementations, the Magic Packet™ may include a sequence of sixteen duplications of the MAC address of the target system 300. The sequence may be located anywhere within the Magic Packet™ and the sequence may also be preceded and/or followed by a synchronization stream (e.g., six bytes of 0xFF).

The wake-up event (e.g., the Magic Packet™) transmitted by the wakening system 120 may pass through zero, one or more of network devices (e.g., hubs, switches, repeaters, bridges, routers, firewalls, modems, wireless devices, and so on) before arriving at the switching system 110. The switching system 110 may process the arrived wake-up event and consequently wake up the appropriate target system 300, as will be described in more detail below.

Figure 4:
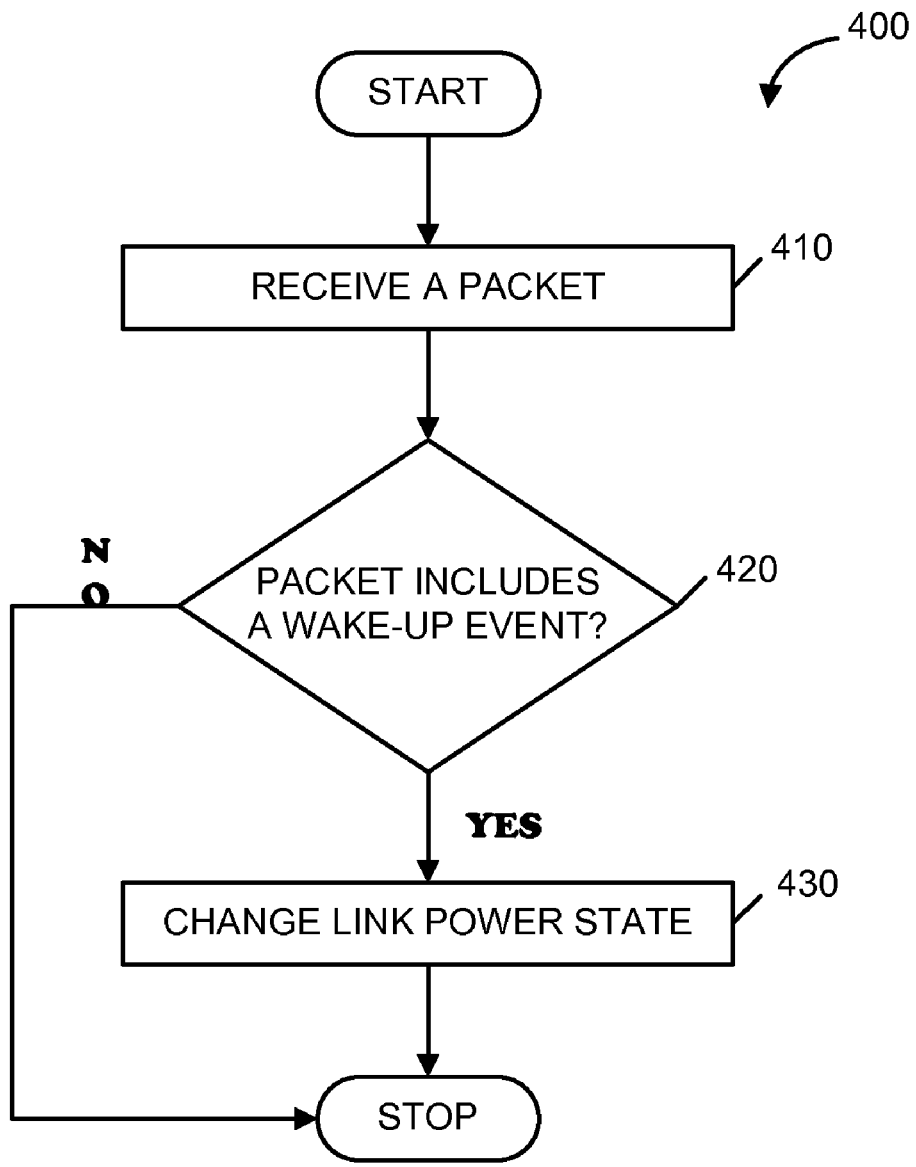
FIG. 4 is flow diagram illustrating an exemplary process 400 for handling a wake-up event.

FIG. 4 is flow diagram illustrating an exemplary method 400 for processing a wake-up event (e.g., in accordance with the Wake-On-LAN standard) that has arrived at a switching system, such as the switching system 200. For ease of explanation, FIG. 4 will be described with reference to FIGS. 2A, 2B and 3. It will be understood, however, that the method 400 may be utilized with systems other than those illustrated in FIGS. 2A, 2B and 3.

When the switching system 200 receives a data unit, e.g., a packet (block 410), the switching system 200 (e.g., the wake-up event detector 260 of the switching system 200) may determine whether the received packet includes data indicative of a wake-up event for the target system 300 (block 420). The switching system 200 may be configured to identify one or more wake-up events, e.g., a pre-defined pattern, a Magic Packet™, etc., as described above. Furthermore, the switching system 200 may be configured to identify wake-up events only on specific ingress ports 230 and/or egress ports 240. In fact, the switching system 200 may be configured to identify different wake-up events on different ingress/egress ports (e.g., Magic Packet™ on port 1 and a predefined pattern related to the IP address of the target system 300 on port 2).

If the switching system 200 determines that the received packet does include data indicative of a wake-up event for the target system 300 ("YES" branch of block 420), the switching system 200 (e.g., wake-up signal generator 270 of the switching system 200) may change the power state of the communication link (e.g., network link 150) associated with the target system 300 (block 230), thereby waking up the target system 300 via network link 150. Otherwise ("NO" branch of block 220), the switching system 200 may wait to analyze another received packet.

If the switching system 200 processes wake-up events transmitted by the wakening system 120, e.g., in accordance with a method such as the method 400 illustrated in FIG. 4, the target system 300 may be awoken remotely without performing any processing of data itself. In other words, the target system 300 may have, in effect, remote wake-up capability even if the target system 300 does not perform any packet processing, e.g., because its network adapter is in a low power state. In some implementations, a wakening system 120 may therefore wake up a target system 300 using the Wake-On-LAN standard even if the target system 300 itself (or the network adapter 320 of the target system 300) is not enabled or configured to conform to the Wake-On-LAN standard. That is, the target system 300 may have the Wake-On-LAN capabilities, in effect, while having only some or none of the hardware and/or software of traditional Wake-On-LAN systems, such as a BIOS that is configured to accept Wake-On-LAN signals, a Wake-On-LAN network adapter and driver, a special three-pin Wake-on-LAN connector, and so on. Moreover, because the target system 300 is not required to detect, for example, Magic Packets™, the target system 300 (more specifically, the network adapter 320 of the target system 300) may require less power to perform the Wake-On-LAN functions, as compared to traditional systems that support the Wake-On-LAN standard. Likewise, the switching system 200 may require less power to perform the Wake-On-LAN functions, as compared to a traditional switching system.

Figure 5:
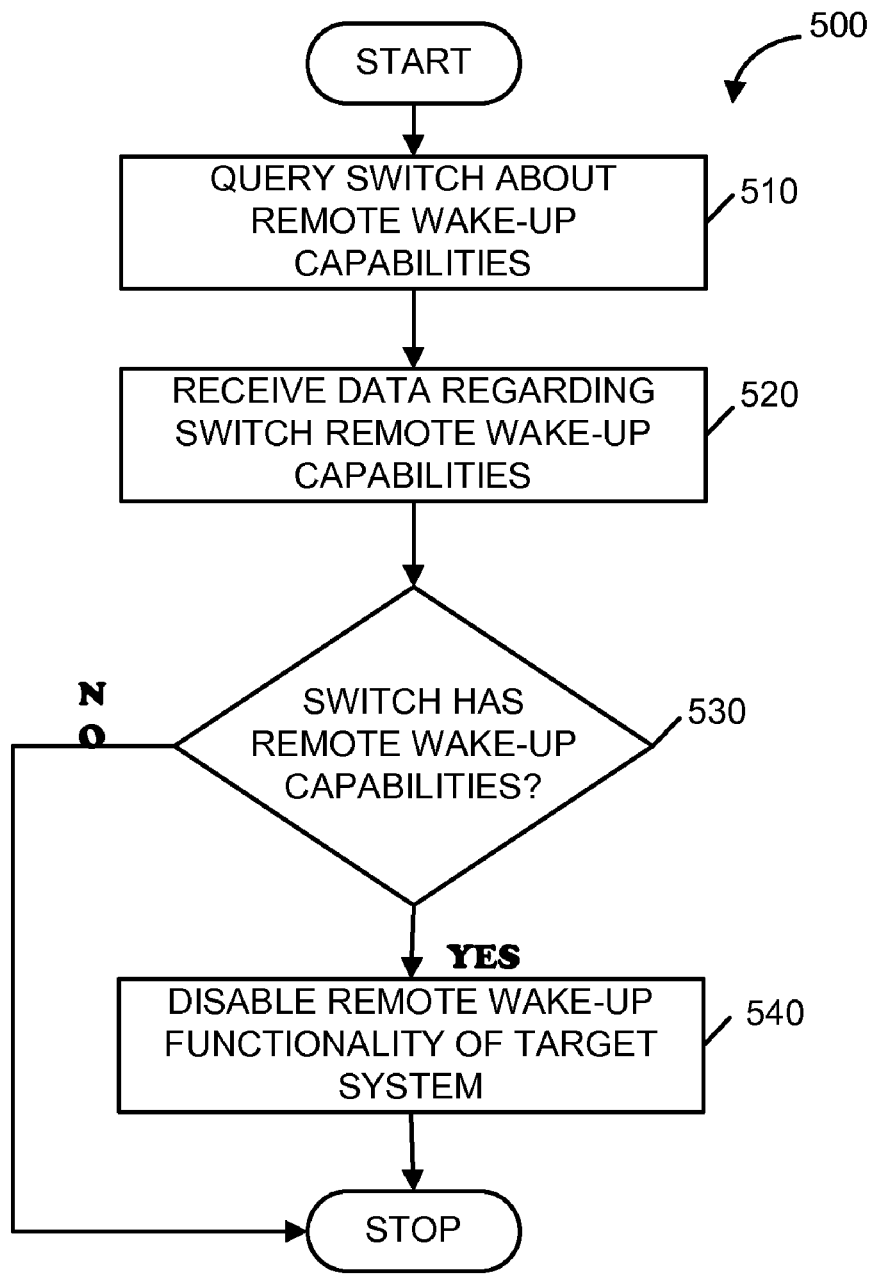
FIG. 5 is flow diagram illustrating an exemplary process for downgrading functionality for remote wake-up on a network adapter.

Furthermore, traditional systems that are enabled with the Wake-On-LAN standard (i.e., that include network adapters with the necessary hardware and/or software to support WOL) may provide Wake-On-LAN functionality even when Wake-On-LAN is downgraded on these systems, e.g., to only detect changes in link state (and not detect any specific packets, such as the Magic Packet™). Therefore, in some implementations, Wake-On-LAN may be purposefully downgraded on target systems 300 for the purpose of minimizing power consumption and operational complexity. In some implementations, Wake-On-LAN may be downgraded manually on the target system (e.g., by a user or administrator of the target system 300). In some implementations, the Wake-On-LAN support may be downgraded on the target system 300 via a communication protocol. The communication protocol may be implemented on the network adapter or elsewhere on the target system 300. For example, the wakening system 120 and/or the switching system 200 may communicate with the target system 300, using the communication protocol, to downgrade the Wake-On-LAN capability of the target system 300 when appropriate FIG. 5 is flow diagram illustrating an example method 500 for downgrading Wake-On-LAN support on a target system 300 via a communication protocol. For ease of explanation, FIG. 5 will be described with reference to FIGS. 2A, 2B and 3. It will be understood, however, that the method 500 may be utilized with systems other than those illustrated in FIGS. 2A, 2B and 3.

In general, the target system 300 may determine capabilities of the switching system 200 for processing remote wake-up events (e.g., Wake-On-LAN wake-up events). If the switching system 200 includes adequate capabilities for processing remote wake-up events (e.g., Wake-On-LAN signals), the functionality for processing remote wake-up events on the target system 300 (e.g., the Wake-On-LAN feature of the target system 300) may be downgraded.

More specifically, in some implementations, the target system 300 may query the switching system 200 regarding the remote wake-up capabilities (e.g., Wake-On-LAN capabilities) of the switching system 200 (block 510). In response, the switching system 200 may send to the target system 300 data regarding the remote wake-up capabilities of the switching system 200 (block 520). For example, the switching system 200 may communicate to the target system 300 whether or not the switching system 200 has any remote wake-up capabilities at all. The switching system 200 may also communicate to the target system 300 details regarding the remote wake-up capabilities of the switching system 200, such as the types of remote wake-up events that the switching system 200 is able to process.

In some implementations, the switching system 200 may send to the network adapter 320 data regarding the remote wake-up capabilities of the switching system 200 even without being queried for that data. Additionally, or alternatively, the switching system 200 may itself query the network adapter 320 regarding some parameters of the target system 300 (e.g., the MAC address of the network adapter 320). In some implementations, the switching system 200 may periodically query the target system 300 for parameters related to the Wake-On-LAN standard. The switching system 200 may also periodically communicate to the target system 300 data related to the remote wake-up capabilities of the switching system 200.

Based on the data received from the switching system 200, the target system 300 may determine whether the switching system 200 includes adequate remote wake-up capabilities. For example, the target system 300 may determine whether the switching system 200 is enabled with, or configure to support, Wake-On-LAN (block 530). If the switching system 200 includes adequate remote wake-up capabilities, the target system 300 may downgrade its own remote wake-up functionality (e.g., downgrade the Wake-On-LAN support on the network adapter 320 of the target system 300, or power down the network adapter 320), thereby consuming less power when operating in a low-power (e.g., SLEEPING) state (block 540).

The target system 300 may further configure the remote wake-up capabilities of the switching system 200. For example, the target system 300 may communicate to the switching system 200 configuration parameters of the network adapter (e.g., MAC address). The target system 300 may also configured the switching system 200 to identify a number of predefined wake-up events, such as a pre-defined pattern, a Magic Packet™, etc., as described above. More generally, the target system 300 may configure the switching system 200 to detect and process remote wake-up events in accordance with any given protocol, standard, etc.

The invention has been described in terms of particular embodiments, but other embodiments can be implemented and are within the scope of the following claims. For example, for ease of explanation, remote wake-up capabilities have been generally described in the context of packets including data indicative of a wake-up event. However, it will be understood that wake-up event data may be included in other data units as well, such as frames, datagrams, cells (e.g., ATM cells), and so on, and the switching system 200 may monitor received, for example, frames for data indicative of a wake-up event. Likewise, for ease of explanation, remote wake-up events and capabilities have been described in the context of the Wake-On-LAN standard. However, it will be understood that any other remote wake-up protocol or standard could be used.

The apparatus and method blocks described above may be implemented in hardware, software or firmware, or some combination of hardware, software and/or firmware. When implemented in hardware, the blocks, operations, techniques, etc., may be implemented in, for example, a custom integrated circuit (IC), an application specific integrated circuit (ASIC), a field programmable logic array (FPGA), a programmable logic array (PLA), etc. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for waking up a computer, the method comprising:
　　causing Wake-On-LAN functionality of the computer to be downgraded based on Wake-On-LAN capabilities of a network switching device, wherein causing the Wake-On-LAN functionality of the computer to be downgraded based on the Wake-On-LAN capabilities of the network switching device includes:
　　　　transmitting, to the computer, data indicating Wake-On-LAN functionality of the switching device, and
　　　　causing a capability of the computer to detect a specific data unit to be disabled;
　　receiving, at a first port of the network switching device, a data unit via a first network link, wherein the first port of the network switching device is coupled to the first network link; and
　　using the network switching device to
　　　　determine whether the data unit includes data indicative of a wake-up event for the computer, and
　　　　change a state of a second network link to wake up the computer if the data unit includes data indicative of the wake-up event for the computer, wherein the second network link is coupled to a second port of the network switching device.

2. The method of claim 1, wherein changing the state of the second network link to wake up the computer includes changing a power state of the second network link.

3. The method of claim 2, wherein changing the power state of the second network link is associated with changing a link speed of the second network link.

4. The method of claim 2, wherein changing the power state of the second network link is associated with powering up the second network link.

5. The method of claim 2, wherein changing the power state of the second network link is associated with establishing a connection on the second network link.

6. The method of claim 1, further comprising receiving, with the network switching device, data to configure the network switching device to identify the data indicative of the wake-up event.

7. The method of claim 1, wherein causing the Wake-On-LAN functionality of the computer to be downgraded based on the Wake-On-LAN capabilities of the network switching device includes causing a network adapter of the computer to be placed in a low-power state.

8. A method for waking up a computer, the method comprising:
    causing Wake-On-LAN functionality of the computer to be downgraded based on Wake-On-LAN capabilities of a network switching device, wherein causing the Wake-On-LAN functionality of the computer to be downgraded based on the Wake-On-LAN capabilities of the network switching device includes:
        transmitting, to the computer, data indicating Wake-On-LAN functionality of the switching device, and
        causing a capability of the computer to detect a specific data unit to be disabled;
    receiving, at a first port of the network switching device, a data unit via a first network communication link, wherein the first port of the network switching device is coupled to the network communication link;
    determining, with the network switching device, that the data unit includes data indicative of a wake-up event for the computer; and
    in response to determining that the data unit includes data indicative of a wake-up event for the computer, changing a power state of a second network communication link to wake up the computer, wherein:
        the second communication link is associated with the computer,
        changing the power state of the second network communication link to wake up the computer comprises the network switching device changing the power state of the second network communication link via a second port of the network switching device, and
        the second port is coupled to the second network communication link.

9. The method of claim 8, further comprising receiving, with the network switching device, data to configure the network switching device to identify the data indicative of the wake-up event.

10. The method of claim 8, wherein causing the Wake-On-LAN functionality of the computer to be downgraded based on the Wake-On-LAN capabilities of the network switching device includes causing a network adapter of the computer to be put in a low-power state.

11. A switching device comprising:
    hardware configured to cause Wake-On-LAN functionality of the computer to be downgraded based on Wake-On-LAN capabilities of a network switching device, wherein causing the Wake-On-LAN functionality of the computer to be downgraded based on the Wake-On-LAN capabilities of the network switching device includes:
        transmitting, to the computer, data indicating Wake-On-LAN functionality of the switching device, and
        causing a capability of the computer to detect a specific data unit to be disabled;
    a plurality of ports including a first port and a second port;
    a wake-up event detector configured to determine whether a data unit received, via a first network link coupled to the first port, includes data indicative of a wake-up event for the computer, wherein the computer is coupled to the switching device via a second network link coupled to the second port; and
    a wake-up signal generator configured to wake up the computer via the second network link by changing a power state of the second network link if the data unit includes data indicative of the wake-up event for the computer, wherein the wake-up signal generator is configured to wake up the computer at least in part by changing a state of the second network link via the second port.

12. The switching device of claim 11, further comprising:
    a forwarding engine coupled to the plurality of ports, wherein the forwarding engine is configured to transfer packets between ports.

13. The switching device of claim 12, wherein the forwarding engine includes the wake-up event detector.

* * * * *